(12) United States Patent
Misra et al.

(10) Patent No.: US 7,770,448 B2
(45) Date of Patent: Aug. 10, 2010

(54) CHEMICAL STORAGE DEVICE WITH INTEGRATED LOAD CELL

(75) Inventors: Ashutosh Misra, Plano, TX (US); Benjamin J. Jurcik, Jr., Richardson, TX (US); Ravi Laxman, San Jose, CA (US)

(73) Assignee: Air Liquide Electronics U.S. LP., Dallas, TX (US)

( * ) Notice: Subject to any disclaimer, the term of this patent is extended or adjusted under 35 U.S.C. 154(b) by 495 days.

(21) Appl. No.: 11/458,565

(22) Filed: Jul. 19, 2006

(65) Prior Publication Data

US 2007/0062270 A1 Mar. 22, 2007

Related U.S. Application Data

(60) Provisional application No. 60/749,982, filed on Dec. 13, 2005, provisional application No. 60/717,672, filed on Sep. 16, 2005.

(51) Int. Cl.
*G01F 23/20* (2006.01)
*G01G 19/00* (2006.01)

(52) U.S. Cl. .......................... 73/296; 177/245; 141/83; 222/58

(58) Field of Classification Search .................. 73/296; 177/210 C, 229, 245; 141/83; 222/58
See application file for complete search history.

(56) References Cited

U.S. PATENT DOCUMENTS

| | | | | |
|---|---|---|---|---|
| 4,345,628 A * | 8/1982 | Campbell et al. | ............. | 141/83 |
| 4,582,100 A * | 4/1986 | Poulsen | ........................ | 141/4 |
| 4,691,793 A * | 9/1987 | Kumakura et al. | ............ | 177/50 |
| 5,007,560 A * | 4/1991 | Sassak | ......................... | 222/1 |
| 5,081,600 A * | 1/1992 | Tump | ........................ | 700/240 |
| 5,096,006 A | 3/1992 | Howard | | |
| 5,490,479 A * | 2/1996 | Shalev | ..................... | 119/51.01 |
| 5,555,764 A * | 9/1996 | Dybas | ........................ | 73/296 |
| 5,764,522 A * | 6/1998 | Shalev | ........................ | 700/240 |
| 5,811,740 A * | 9/1998 | Hamilton, Sr. | ............. | 177/144 |
| 5,837,944 A * | 11/1998 | Herot | ........................ | 177/245 |
| 5,929,390 A * | 7/1999 | Naito et al. | ................. | 177/211 |
| 5,941,090 A | 8/1999 | Knutson et al. | | |
| 6,134,896 A * | 10/2000 | Brown et al. | ................. | 62/149 |
| 6,407,349 B1 * | 6/2002 | Stahl | ..................... | 177/210 C |
| 2005/0039955 A1 | 2/2005 | Scholz et al. | | |
| 2005/0126277 A1 * | 6/2005 | Nelson | ....................... | 73/149 |

FOREIGN PATENT DOCUMENTS

DE 103 38 290 1/2005

OTHER PUBLICATIONS

Int'l Preliminary Report on Patentability and Written Opinion for PCT/IB2006/002480.
Australian Written Opinion for SG 200800415-2.

* cited by examiner

*Primary Examiner*—Randy W Gibson
(74) *Attorney, Agent, or Firm*—Patricia E. McQueeney (57) ABSTRACT

A chemical storage device and a method for monitoring chemical usage are described herein. The device and disclosed method utilize a chemical storage canister and a load cell integrated into one transportable unit. The load cell is capable of compensating for the added weight of attached dispensing devices used in the semiconductor industry. Additionally, the load cell continuously displays the weight of the chemicals as they are withdrawn from the chemical storage device. These functionalities are included in the control logic of the load cell which is incorporated into the load cell itself.

27 Claims, 5 Drawing Sheets

CHEMICAL STORAGE DEVICE WITH INTEGRATED LOAD CELL

CROSS-REFERENCE TO RELATED APPLICATIONS

The present application claims the benefit of 35 U.S.C. 111(b) provisional application Ser. No. 60/717,672 filed Sep. 16, 2005, and entitled "Chemical Storage Container with Integrated Load Cell for Measurement of Canister Contents" and 35 U.S.C. 111(b) provisional application Ser. No. 60/749,982 filed Dec. 13, 2005, and entitled "Load Cell Level Sensors for Monitoring Solid and Liquid Chemical Level in Containers Containing Chemical Vapor Deposition Precursors Used in Processes Such as PECVD, LPCVD, ALD."

STATEMENT REGARDING FEDERALLY SPONSORED RESEARCH OR DEVELOPMENT

BACKGROUND

1. Field of the Invention

This invention relates generally to the field of chemical storage. More specifically, the invention relates to a method and an apparatus for monitoring chemical usage.

2. Background of the Invention

A wide variety of chemicals are used as precursors for chemical vapor deposition in the semiconductor industry. In general, the precursors for the production of films or layers on a wafer are liquids with a relatively low vapor pressure at room temperature (<500 Torr at room temperature). Currently, the precursor materials are stored in steel (stainless, carbon, or other specialty alloy depending upon the precursor characteristics) canisters that are sealed and leak-tight. Canisters may be utilized either close to the chemical vapor deposition chamber, where they are replaced periodically as each canister gets depleted, or in a bulk refill system that provides a source for the automatic refill of canisters at their point of use.

There are at least two reasons why it is important to monitor the chemical level in a storage canister. The first is to ensure that there is adequate precursor chemical in the canister to perform the desired chemical vapor deposition step. The second is to be able to use the maximum amount of the precursor chemical in the process prior to replacing the canister. This second point affects overall system cost effectiveness. Once a canister has been disconnected, any remaining material is discarded. Thus, if a canister is replaced before being maximally depleted, not only are materials wasted, but additional costs are incurred in disposing of the additional waste product.

Various techniques for reducing waste have been attempted, including the use of float switches and level sensors. No method to date has proved entirely satisfactory in actual operations, however.

The fundamental drawback to the technologies that have been currently implemented is that they are not universally applicable to all types of chemicals. For example, float switches may not operate as expected if the specific gravity of the precursor chemical changes. In addition, level sensors typically do not provide a visual indication of the contents of the canister. In order to obtain information, the canister must be connected to the dispensing equipment and the signals from the level sensors must be interpreted and displayed on the dispensing systems computer or a programmable logic controller.

Consequently, there is a need for a method and a chemical storage device that allows real-time monitoring of chemical usage regardless of chemical type or phase.

BRIEF SUMMARY

A chemical storage device and a method for monitoring chemical usage are described herein. The device and method address the problems above by integrating a chemical storage canister and a load cell into one transportable unit. The load cell is capable of compensating for the added weight of attached dispensing devices used in the semiconductor industry. Additionally, the load cell continuously displays the weight of the chemicals remaining in the chemical storage device. These functionalities are included in the control logic of the load cell, which is integrated into the load cell itself.

These and other needs in the art are addressed in one embodiment by a chemical storage device comprising a canister. The chemical storage device further comprises a load cell integral with said canister. The load cell comprises a processor and a display. Additionally, the chemical storage device comprises control logic executable on said processor, wherein said control logic causes the load cell to tare the empty weight of the canister in response to a user input. The control logic also causes the load cell to display the weight of at least one chemical added to the canister on said display. Moreover, the control logic causes the load cell to calibrate itself after a dispensing device is attached to the canister such that only the weight of the chemical is shown on the display and to continuously display the weight of the chemical remaining in the canister.

In another embodiment, a method for monitoring chemical usage comprises taring the weight of an empty chemical storage device comprising an integral load cell. Furthermore, the method comprises filling the chemical storage device with at least one chemical to a fill weight. In addition, the method comprises attaching the chemical storage device to a dispensing device. The method also comprises calibrating the load cell to compensate for the weight of the dispensing device such that only the fill weight of the chemical is displayed. The method further comprises continuously measuring the weight of the chemical remaining in the chemical storage device.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and the specific embodiments disclosed herein may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
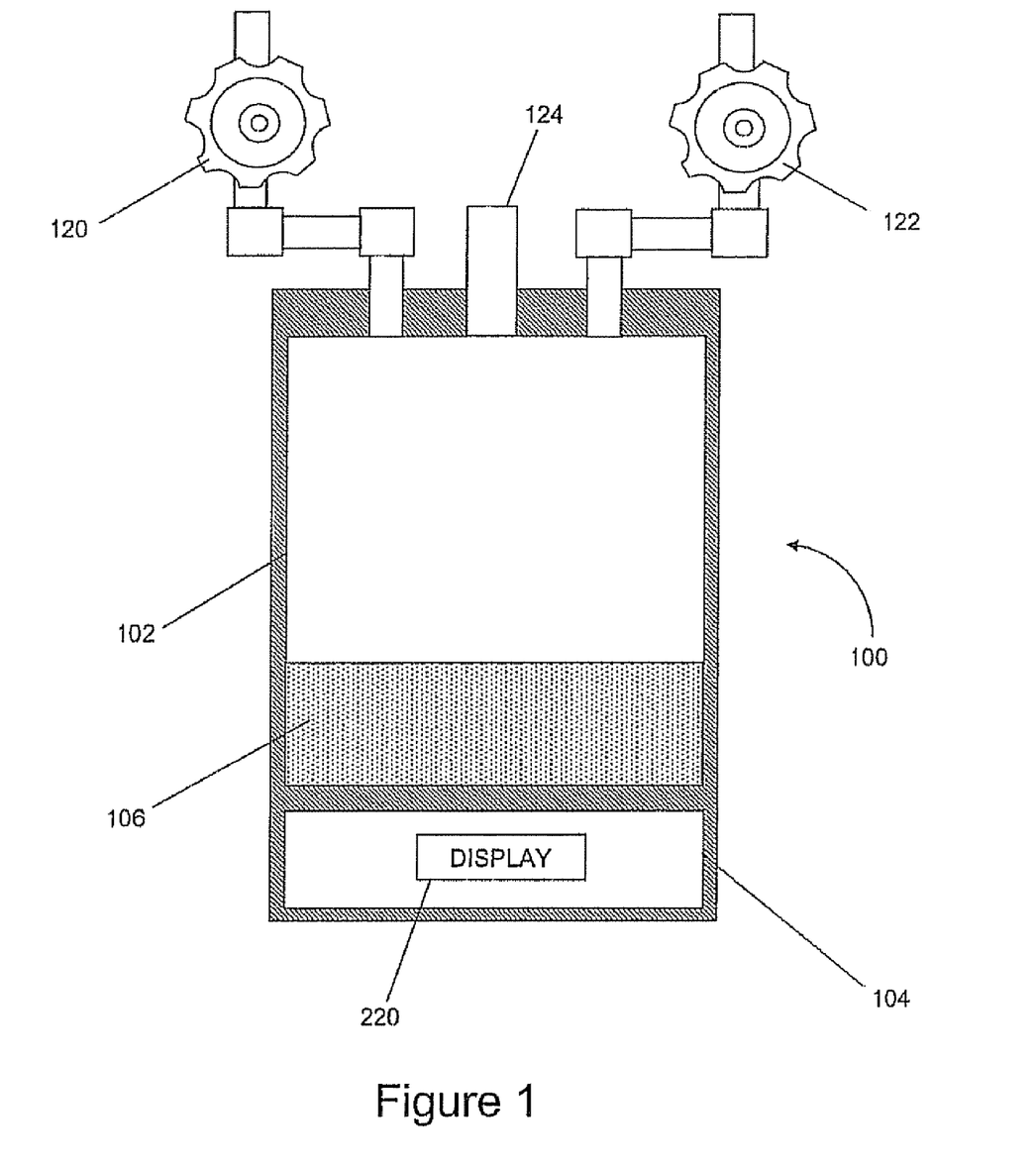
FIG. 1 is a schematic of an embodiment of a chemical storage device.

FIG. 1 illustrates one embodiment of a chemical storage device 100. Generally, chemical storage device 100 includes a canister 102 and a load cell 104. Load cell 104 is integrated into the canister 102 and is used to measure initially how much chemical 106 is filled into the canister. This value may be stored by the load cell 104. Prior to any chemical being used, a dispensing device is attached and chemical storage device 100 is then re-tared to compensate for the increased or decreased downward force resulting from the attached dispensing device such that the display continues to indicate the initial fill weight. As the chemicals 106 are consumed, chemical storage device 100 changes its operating mode and continuously monitors the weight of the contents remaining in the canister. The true weight of the chemicals 106 in the canister 102 is thus continuously displayed to the user. The logic for monitoring the content weight is integrated into the chemical storage device 100 itself in one convenient device. Chemical storage device 100 is preferably designed to be easily transportable.

Canister 102 is equipped with a plurality of valves or the like to allow the introduction and removal of chemicals to and from the canister 102. In some embodiments, the valves are located on the top of the canister 102. In an embodiment, an inlet valve 120 and an outlet valve 122 are coupled to the canister. In further embodiments, a third valve 124 may be coupled to the canister for other purposes, such as temperature monitoring. Generally, the valves are in fluid communication with the interior of the canister. Preferably, the valves are easily connected and disconnected to existing dispensing devices used in the semiconductor industry so as to facilitate transportation. Examples of dispensing units include without limitation, the CANDI systems from Air Liquide, Aquarius systems from Japan Air Gases, the Unichem systems from ATMI, the Chemguard system from the Schumacher division of Air Products, or other suppliers.

Canister 102 may have any suitable geometry, however canister 102 is preferably cylindrical. The cross-section of canister 102 may be rectangular, hexagonal, octagonal, triangular, etc. Canister 102 may be any suitable size. In typical embodiments, the empty canister weighs from about 2000 g to about 6000 g. Generally, canister 102 is capable of storing chemicals in the weight range from about 250 g to about 200 kg, more preferably from about 250 g to about 3000 g and in some instances up to 10,000 g or more. Furthermore, the canister 102 is capable of storing liquids, powders, solids, gas, etc.

In preferred embodiments, canister 102 and load cell 104 are made of metal. Any suitable metal may be utilized. The metal preferably is resistant to oxidation and corrosion and is capable of containing liquids, gases and solids. Examples of suitable metals include without limitation, stainless steel 304, 316L, carbon steel, Hastelloy, Monel, and other high Ni containing alloys, Elgiloy, Aluminum, etc.

Figure 2:
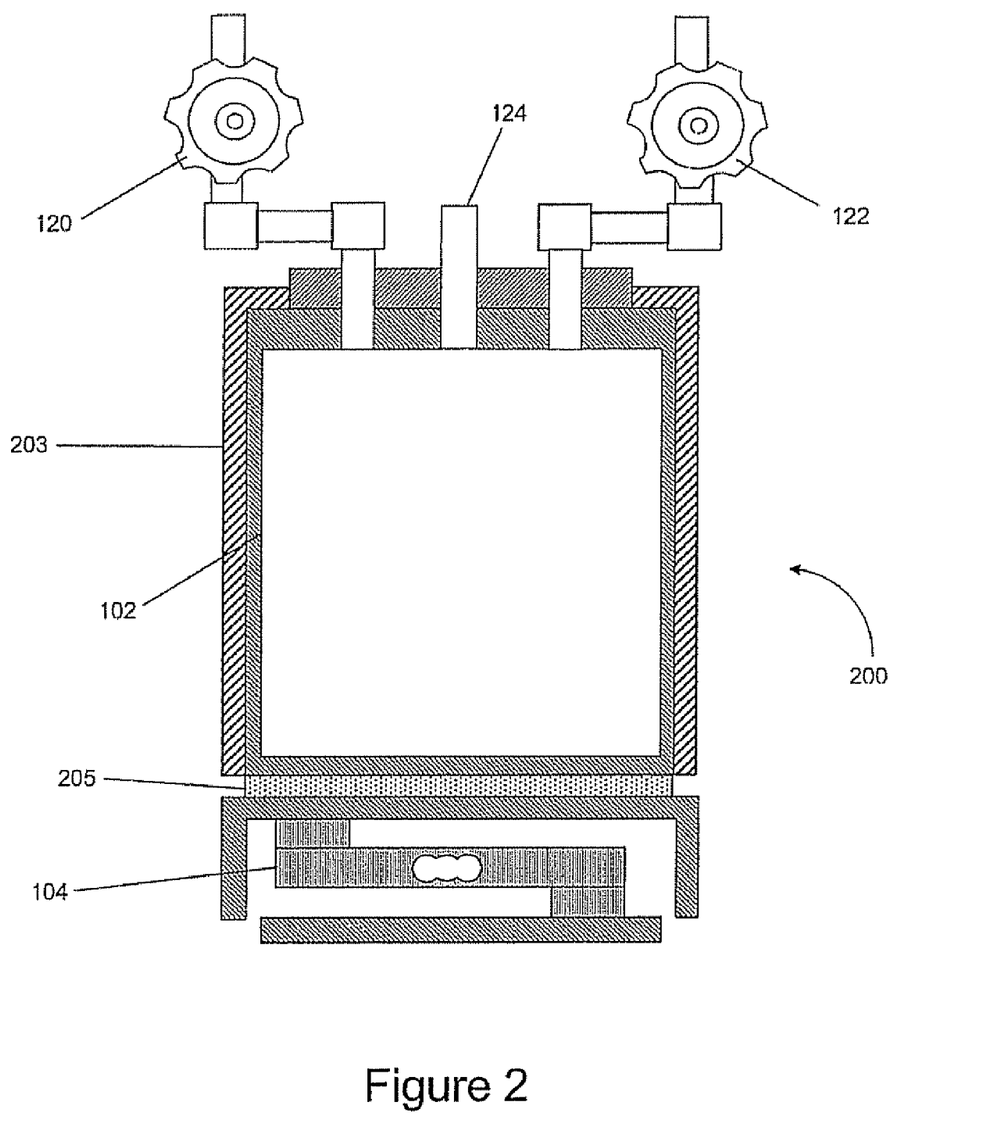
FIG. 2 is a schematic of an embodiment of a chemical storage device for elevated temperature applications.

Referring now to FIG. 2, an embodiment of chemical storage device 200 for elevated temperature applications is shown comprising a heating jacket 203. Heating jacket 203 is typically capable of heating the canister contents to a temperature in the range from about 20° C. to about 350° C. Furthermore, heating jacket 203 may be heated by circulating fluid or resistive heating elements. Typically, heating jacket 203 is connected to a temperature controller to regulate the temperature of canister contents (not shown). The temperature controller may be any device known to one of skill in the art used to regulate temperature. Canister 102 may also include any other means suitable for heating the canister contents to the desired temperature. Examples of other suitable means include without limitation, cartridge heaters inserted into the canister body or heating tape wrapped around the canister body.

In further embodiments, load cell 104 is thermally insulated from canister 102. An insulating material may be disposed between the load cell and the canister to prevent or reduce the transmission of heat to the load cell. In a specific embodiment, the insulating material is a ceramic plate 205 (FIG. 2). The ceramic plate 205 preferably has a thickness in the range of about $\frac{1}{16}$ inch to about 2 inches, preferably at least about $\frac{1}{8}$ inch, more preferably at least about $\frac{3}{8}$ inch. However, the ceramic plate 205 may comprise any suitable thickness. Alternatively, other suitable insulating materials may be used besides ceramic. Examples of other suitable materials include without limitation, nanoporous materials, polymers, fiberglass, etc. In preferred embodiments, load cell 104 is maintained at a temperature ranging from about 40° C. to about 60° C.

Load cell 104 is preferably integral with or built in to the canister 102 such that the canister and load cell form a single transportable unit. In some embodiments, load cell 104 and canister 102 are separate elements that are mechanically coupled. Load cell 104 may be coupled to canister 102 by any means such as welding, bolting, screws, etc. Alternatively, load cell 104 may be removably attached to canister 102.

Figure 3:
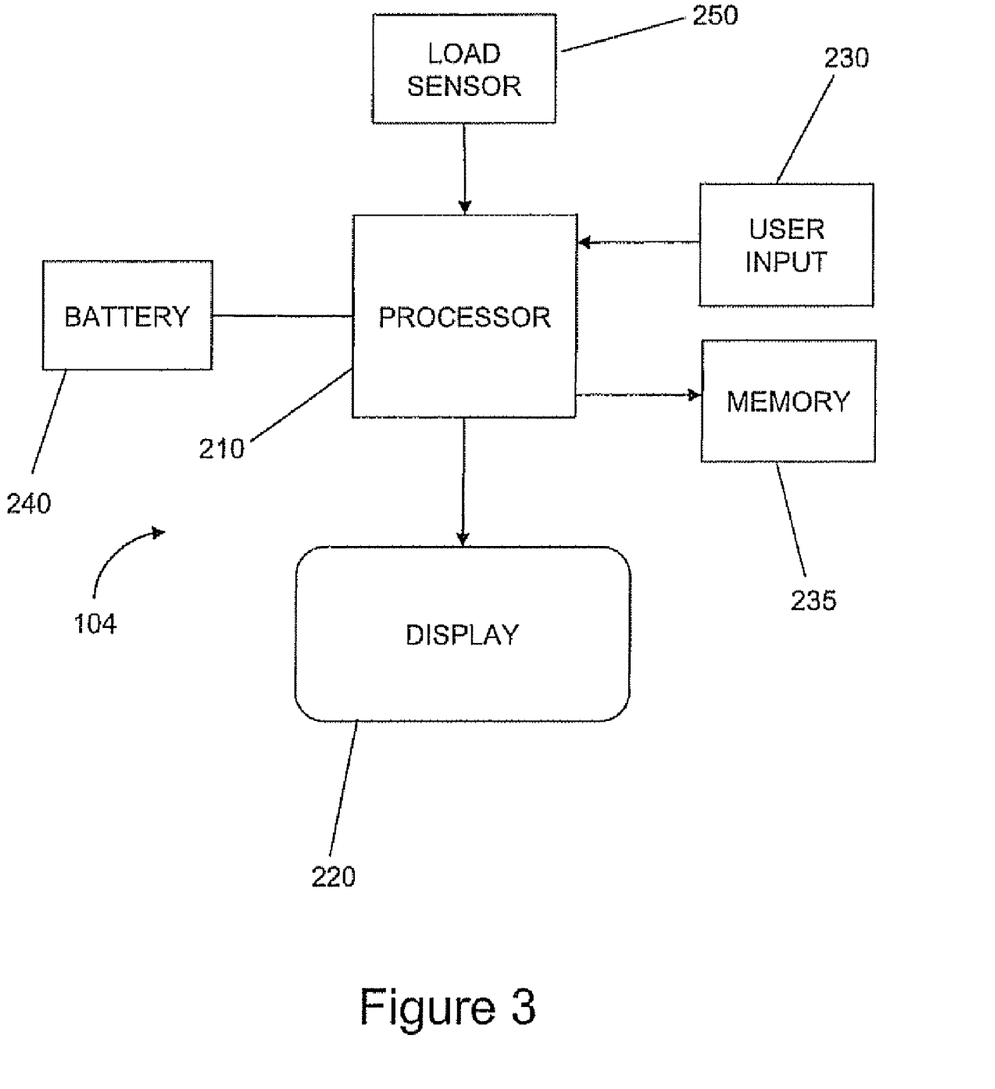
FIG. 3 illustrates an embodiment of a load cell sensor.

FIG. 3 is a schematic illustration of an embodiment of a load cell 104. As shown, the load cell 104 generally includes a processor 210, a memory module 235, a battery 240, and a load sensor 250. Typically, the load cell also comprises a battery 240 as its primary energy source. Battery 240 provides power to load cell 104. However, load cell 104 may also be connected to an external power source if necessary. Preferably, battery 240 has a capacity to last at least one year in normal operations without recharging or exchanging the battery. Examples of battery 240 include without limitation, a lithium ion battery, a nickel cadmium battery, etc.

Processor 210 is generally a low-power, mixed signal microprocessor. However, load cell 104 may include any processor suitable for implementing the functionality of load cell 104 as explained herein. Processor 210 preferably couples to a memory module and a load sensor 250. In addition, memory module 235 preferably comprises volatile and/or non-volatile memory. The non-volatile memory may comprise Flash memory. Alternatively, the volatile memory may comprise any suitable type of random access memory (RAM). Memory module 235 is used to store code or control logic that is executed by processor 210. Such control logic may be loaded into load cell 104 during manufacturing. The control logic may be loaded into non-volatile memory and either executed directly from the non-volatile memory or copied to the volatile memory for execution therefrom. Moreover, memory module 235 may be used to store or "lock" in the initial combined weight of the canister, the canister contents, and load cell.

In further embodiments, load cell 104 comprises a display 220 (FIGS. 1 and 3). Display 220 is preferably but not necessarily capable of displaying weights with up to 0.1 g precision. Generally, display 220 is a liquid crystal display (LCD). In some embodiments, display 220 further shows the different operating modes of load cell 104. For example, display 220 may show that load cell 104 is locked with the current fill weight value. In another example, display 220 may show that load cell 104 is in an active weighing mode. In typical embodiments, display 220 is located on the exterior of chemical storage device 100.

Load cell 104 generally comprises a user input device 230 such as a keypad. The keypad is preferably located in close proximity to the display. In other embodiments, the keypad is located in a recessed housing to prevent accidental depression of the keypad buttons. The keypad enables a user to manually tare and calibrate the load cell 102. Other functionalities may be operated by the keypad. Alternatively, user input device 230 may be a touch screen on display 220. In another embodiment, user input device 230 contains a locking function such that inadvertent interaction with the device will not activate the load cell.

In further embodiments, the load cell 104 comprises a port that is capable of transmitting data to an external monitoring device such as a computer (not shown). Examples of ports include without limitation, a USB port, a serial port, an infrared port, a Firewire port, an Ethernet port, etc. The external monitoring device may be any suitable device capable of recording and storing data. Examples of external monitoring devices include without limitation, a computer, a personal digital assistant (PDA), etc. In other embodiments, load cell 104 comprises a wireless receiver and transmitter. The wireless receiver and transmitter are capable of receiving and transmitting data wirelessly to an external monitoring device. Additionally, the wireless receiver may control the load cell 104 via a remote user input device such as a remote control.

Load sensor 250 may comprise any type of sensor capable of measuring weight without coming into physical contact with the contents of canister 102. In preferred embodiments, load sensor 250 comprises a Wheatstone bridge sensor. The Wheatstone bridge sensor may be manufactured in-house or purchased commercially. An example of a commercially available Wheatstone bridge sensor is Model PW2GC3 from HBM, Inc. Alternatively, load sensor 250 comprises a capacitance measurement sensor. Capacitance measurement sensors are available from LoadStar Sensors, Inc. in California. Additionally, while load sensor 250 is preferably capable of weighing the contents of the canister to a precision of about 0.1 g, load sensor 250 may be capable of lower or higher precision, ranging from about 1 g to about 0.01 g, depending on the application. In preferred embodiments, load sensor 250 is capable of sensing accurately across the operating weight range of the device. Specifically, load sensor 250 is preferably capable of measuring from about 250 g up to at least about 10,000 g.

In another embodiment, only load sensor 250 is integral or coupled to canister 102 (embodiment not shown). In this embodiment, an external controller including display 220, processor 210, user input device 230, and memory 235 is connected to load cell sensor 250. The external controller is connected to load sensor 250 when the chemicals are to be weighed and is disconnected when chemical storage device 100 is transported to a different location.

Figure 4:
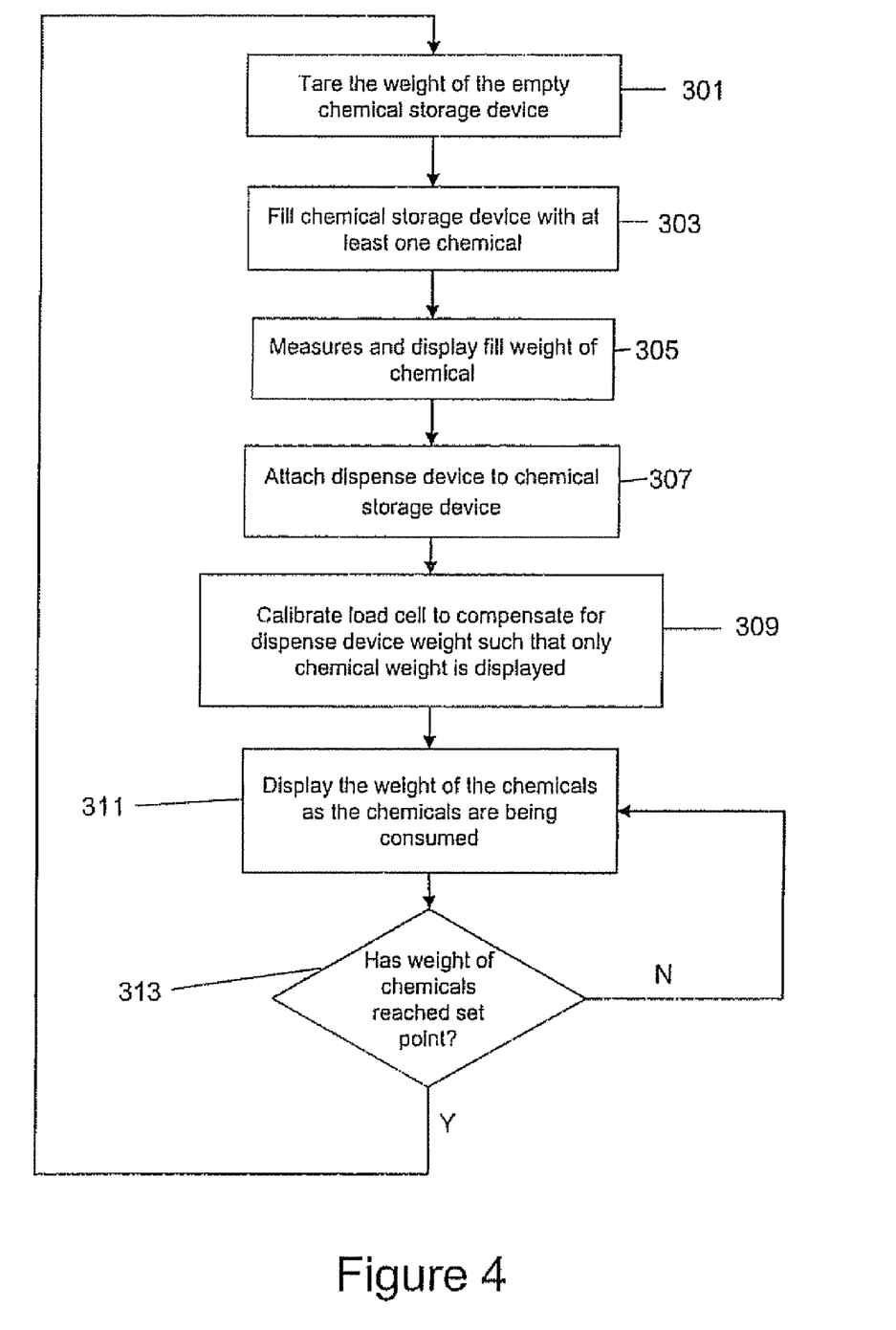
FIG. 4 is a flow diagram of a method for monitoring chemical usage.

FIG. 4 illustrates a method of monitoring real-time chemical usage by a user. For ease of discussion, the following description of the method refers to the same reference numbers used to describe the embodiments of the apparatus as disclosed above. Generally, the method initially comprises providing a chemical storage device 100 comprising a load cell 104 integrated to a canister 102. Referring now to FIG. 4, the method comprises taring the empty chemical storage device 100 in block 301. After the weight of the empty canister 102 and load cell 104 is zeroed, a desired amount of at least one chemical is then added to the canister. Generally, the chemical is added through inlet valve 120 or valve 124.

The weight of the empty chemical storage device 100 is typically tared via user input through user input device 230. By way of example only, a button on a keypad is depressed to tare the load cell 104. After taring, load cell 104 measures the weight of the added chemical and displays the weight of the chemical contained in canister 102 on display 220 (see FIG. 1) in block 305. One or more chemicals may be added to the canister 102. Generally, the chemicals are added through any one of the valves 120, 122, or 124. Once chemical storage device 100 is filled with the desired chemical, it is transported to the end user which is typically a semiconductor manufacturing facility. However, the user may be any customer or consumer of chemicals. Chemical storage device 100 is transported with the fill weight displayed on display 220. In an embodiment, the weight information is locked or stored in load cell memory 235. Generally, the weight of the canister contents is locked in response to a user input from the user input device 230. For example, another button may be depressed on the user input device to store the fill weight and lock the displayed weight.

The user receives chemical storage device 100, and connects a dispensing device, by the appropriate fittings, to the appropriate point of use such as inlet and outlet valves 120, 122 in block 307. The dispensing device is typically any device or tool used in the semiconductor industry that withdraws and dispenses chemicals for use in semiconductor fabrication. During the connection, chemical storage device 100 may experience a weight gain due to the weight of the fittings, as well as any downward force resulting from applying the fittings to the canister. The added weight comes from the force exerted by the pigtails of the dispensing units that are used in the semiconductor industry. The pigtails are used generically herein to describe any tubing and valves that are used to connect the inlet and or outlet valves of the chemical storage device to a fixed valve manifold that performs the functions necessary for dispensing the chemical. The pigtails have a certain amount of flexibility in order to adapt to slight variations in canister sizes and to make the exchange of the chemical storage device easy. Due to the flexibility that is required, the pigtails exert a force on the chemical storage device (interpreted as weight) thereby changing the signal that is read by load sensor 250.

In response to a user input, i.e. depression of a button, load sensor 250 is re-calibrated to compensate for the added weight of the fittings in block 309. Thus, only the weight of the chemicals or materials in the canister 102 is displayed on display 220; the weight from the added fittings is not displayed. Alternatively, load cell 104 automatically compensates for any added weight from the dispensing device after the dispensing device has been attached without the need for user input.

As canister 102 is depleted of its contents, load cell 104 continuously measures and displays the current weight of the remaining contents in block 311. Furthermore, an external monitoring device (not shown) may be connected to load cell 104 via a port such that weight data is continuously transmitted to the external monitoring device and recorded. In an embodiment, the external monitoring device plots the chemical usage over time. Alternatively, the external monitoring device communicates with the load cell 104 wirelessly.

When the displayed contents weight reaches a predetermined set point in block 313, the chemical storage device is refilled for further use. Typically, chemical storage device 100 is disconnected and shipped to another location for refilling. Any residual chemicals may be removed before refilling. In an alternative embodiment, the canister is refilled on-site without needing to be disconnected. In further embodiments, load cell 104 notifies a user that a predetermined set point has been reached by emitting an audible sound such as a beep. The predetermined set point may be programmed by a user via the user input device and stored in load cell memory.

To further illustrate the present invention, the following non-limiting examples are provided:

EXAMPLE 1

Load Cell Measurements Versus Conventional Scale Measurements

Figure 5:
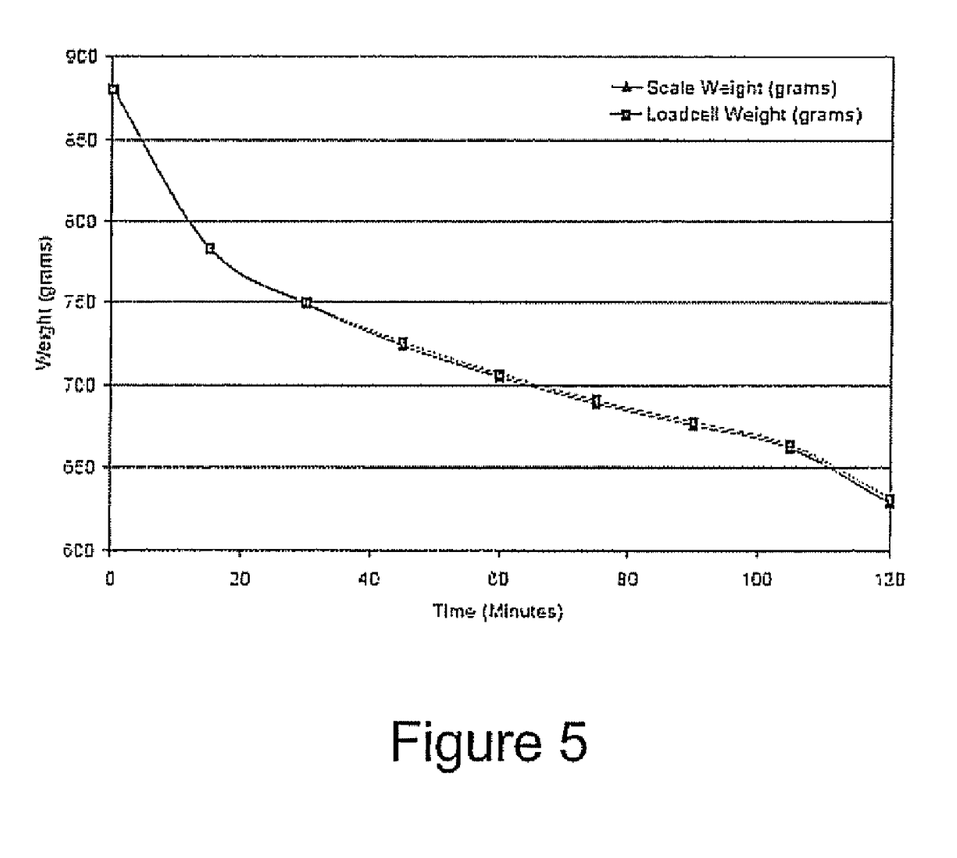
FIG. 5 is a comparison of load cell values to conventional weigh scale values.

A canister with an integrated load cell was placed on top of a weigh scale. The canister was filled with about 300 mL of isopropyl alcohol. Nitrogen was introduced into the canister through an inlet valve and vented through the exit valve. The nitrogen evaporated the alcohol as it passed through the container. Weigh scale readings and load cell readings were taken at specified time intervals. Results of the load cell values and the weigh scale readings are shown in FIG. 5. Results show that the load cell values accurately match conventional weigh scale readings demonstrating the feasibility of the chemical storage device.

EXAMPLE 2

Chemical Storage Device for Elevated Temperature Applications

A prototype chemical storage device comprising a heating jacket was built for high temperature applications. The canister was constructed with an outer diameter of 4.5 inches and a height of 6.5 inches. A heating jacket with a thickness of ¾ inch surrounded the canister. A ⅜ inch thick ceramic plate was disposed between the canister and the load cell. Weight measurements taken at 170° C. showed no change when compared to measurements taken at room temperature. These results demonstrate the feasibility of using the chemical storage device at high temperatures.

Although the present invention and its advantages have been described in detail, it should be understood that various changes, substitutions and alterations may be made herein without departing from the scope of the invention as defined by the appended claims. Likewise, the sequential recitation of steps in the claims is not intended to require that the steps be performed sequentially, or that a particular step be completed before commencement of another step.

What is claimed is:

1. A chemical storage device for use in connection with a dispensing device, comprising:
   a canister;
   a load cell integral with said canister, said load cell comprising a processor and a display;
   control logic executable on said processor, wherein said control logic causes said load cell to:
   a) tare the empty weight of said canister in response to a user input;
   b) display the weight of at least one chemical added to said canister on said display;
   c) calibrate said load cell after said dispensing device is attached to said canister such that only said weight of said at least one chemical is shown on said display; and
   d) continuously display the weight of said at least one chemical as said at least one chemical is consumed.

2. The chemical storage device of claim 1, wherein a plurality of valves are coupled to the canister, and wherein each of said valves is in fluid communication with the interior of the canister.

3. The chemical storage device of claim 1, further comprising means for heating said canister.

4. The chemical storage device of claim 1, further comprising an insulating layer disposed between the load cell and the canister.

5. The chemical storage device of claim 4, wherein the insulating layer comprises a ceramic plate.

6. The chemical storage device of claim 1, wherein the canister and the load cell are made of stainless steel.

7. The chemical storage device of claim 1, wherein the canister is capable of containing a liquid, a solid, or a gas.

8. The chemical storage device of claim 1, wherein the load cell further comprises a battery.

9. The chemical storage device of claim 1, wherein the load cell further comprises a memory module coupled to the processor.

10. The chemical storage device of claim 1, wherein the load cell further comprises a user input device.

11. The chemical storage device of claim 10, wherein a) occurs in response to a user input from the user input device.

12. The chemical storage device of claim 10, wherein c) occurs in response to a user input from the user input device.

13. The chemical storage device of claim 10, wherein the user input device comprises a keypad.

14. The chemical storage device of claim 9, wherein said control logic further causes the load cell to store the weight of the at least one chemical added to the canister in the memory module in response to a user input.

15. The chemical storage device of claim 1, wherein the load cell further comprises a load sensor coupled to the processor.

16. The chemical storage device of claim 15, wherein the load sensor comprises a wheatstone bridge type sensor.

17. The chemical storage device of claim 15, wherein the load sensor comprises a capacitance type measurement sensor.

18. The chemical storage device of claim 15, wherein said load sensor is capable of measuring weight in the range from about 250 g to about 10,000 g.

19. The chemical storage device of claim 15, wherein said load sensor is capable of measuring weight to a precision of about 0.1 g.

20. A method of monitoring chemical usage comprising:
   a) taring the weight of an empty chemical storage device that includes an integral load cell;

b) filling the chemical storage device with at least one chemical to a fill weight;
c) attaching the chemical storage device to a dispensing device;
d) calibrating the load cell to compensate for the weight of the dispensing device such that only the fill weight of the at least one chemical is displayed;
e) continuously measuring the weight of the at least one chemical remaining in the chemical storage device.

21. The method of claim 20, wherein the chemical storage device further comprises a display, a memory module, and a user input device.

22. The method of claim 21, wherein (b) further comprises displaying the fill weight on the display.

23. The method of claim 21, wherein (e) further comprises displaying on the display the weight of the at least one chemical remaining in the chemical storage device.

24. The method of claim 21, further comprising storing the fill weight in the memory module after (b).

25. The method of claim 20, further comprising transporting the chemical storage device to a semiconductor manufacturing facility after (b).

26. The method of claim 20, wherein (a) is performed in response to a user input.

27. The method of claim 20, wherein (e) is performed in response to a user input.

* * * * *